United States Patent [19]
Moriya

[11] Patent Number: 6,001,302
[45] Date of Patent: Dec. 14, 1999

[54] METHOD OF BLOW-MOLDING AN ARTICLE OF LIQUID CRYSTAL POLYMER AND POROUS PTFE

[75] Inventor: Akira Moriya, Okayama, Japan

[73] Assignee: Japan Gore-Tex, Inc., Tokyo, Japan

[21] Appl. No.: 09/111,141

[22] Filed: Jul. 7, 1998

Related U.S. Application Data

[63] Continuation-in-part of application No. 08/715,954, Sep. 19, 1996, Pat. No. 5,863,488.

[30] Foreign Application Priority Data

Sep. 22, 1995 [JP] Japan ..................... 7-269172

[51] Int. Cl.⁶ .................................................. B29C 49/22
[52] U.S. Cl. ............................... 264/512; 264/515; 428/1
[58] Field of Search ..................... 264/512, 515; 428/1

[56] References Cited

U.S. PATENT DOCUMENTS

| | | | |
|---|---|---|---|
| 3,953,566 | 4/1976 | Gore | 264/288 |
| 4,187,390 | 2/1980 | Gore | 174/102 R |
| 5,094,806 | 3/1992 | Laughner | 264/523 |
| 5,306,461 | 4/1994 | Corallo et al. | 264/540 |
| 5,330,697 | 7/1994 | Wong | 264/173.12 |
| 5,336,464 | 8/1994 | Corallo et al. | 264/540 |
| 5,405,565 | 4/1995 | Sumida et al. | 264/173.14 |
| 5,443,783 | 8/1995 | Shepherd et al. | 264/540 |
| 5,534,209 | 7/1996 | Moriya | 264/171.13 |
| 5,681,624 | 10/1997 | Moriya | 428/1 |
| 5,752,934 | 5/1998 | Campbell et al. | 604/96 |
| 5,900,292 | 5/1999 | Moriya | 428/1 |

FOREIGN PATENT DOCUMENTS 0 612 612   8/1994   European Pat. Off. .

OTHER PUBLICATIONS

Derwent Acc No 1998–110705.

*Primary Examiner*—Catherine Timm
*Attorney, Agent, or Firm*—Gary A. Samuels

[57] ABSTRACT

Complex-shaped articles formed by gas-pressure-molding composite preforms of liquid crystal polymer and porous polytetrafluoroethylene material are described. Processes for making the composite material preforms and parisons needed for gas-pressure-molding methods, such as vacuum-molding and blow-molding, are also described.

8 Claims, 2 Drawing Sheets

METHOD OF BLOW-MOLDING AN ARTICLE OF LIQUID CRYSTAL POLYMER AND POROUS PTFE

RELATED APPLICATIONS

The present application is a continuation-in-part of U.S. patent application Ser. No. 08/715,954 filed Sep. 19, 1996 now U.S. Pat. No. 5,863,488.

FIELD OF THE INVENTION

The invention relates to complex-shaped articles comprising a liquid crystal polymer or liquid crystal polymer alloy, more specifically, to such articles made by methods such as blow-molding, vacuum-forming, or the like.

BACKGROUND OF THE INVENTION

Liquid crystal polymers are a family of materials that exhibit a highly ordered structure in the melt, solution, and solid states. They can be broadly classified into two types; lyotropic, having liquid crystal properties in the solution state, and thermotropic, having liquid crystal properties in the melted state.

Further discussion of liquid crystal polymers hereinbelow refers only to thermotropic liquid crystal polymers, i.e., those liquid crystal polymers and liquid crystal polymer alloys which are processed in the melted state. Also, liquid crystal polymer, as used herein, is meant to include polymer alloys having a liquid crystal polymer component as well as liquid crystal polymers alone. For convenience, the term "liquid crystal polymer" is used herein to include material of both kinds.

Most liquid crystal polymers exhibit excellent physical properties such as high strength, good heat resistance, low coefficient of thermal expansion, good electrical insulation characteristics, low moisture absorption, and are good barriers to gas flow. Such properties make them useful in a broad range of applications in the form of fibers, injection molded articles, and, in sheet form, as electronic materials for printed circuit boards, packaging, and the like.

Many of the physical properties of liquid crystal polymers are very sensitive to the direction of orientation of the liquid crystal regions in the polymer. The ordered structure of the liquid crystal polymer is easily oriented by shear forces occurring during processing and highly aligned liquid crystal chains can be developed that are retained in the solid state, and result in highly anisotropic properties. This can be highly desirable for certain products, for example, in filaments, fibers, yarns, and the like. Anisotropic properties are often not desirable, however, in products having planar forms, such as tape, films, sheet, and the like.

A number of methods are used to produce liquid crystal polymer materials in planar forms that have more balanced, less anisotropic properties. These include the use of multilayer flat extrusion dies which are fashioned such that they extrude overlapping layers at intersecting angles, use of static mixer-agitators at the die inlets, and the like. More recently, dies having rotating or counter-rotating surfaces have become known in the art and successfully used. These extrusion techniques, used separately or in combination with other methods known in the art, such as film blowing, can produce liquid crystal polymer film and sheet that are multiaxially oriented, that is, oriented in more than one direction, and have more balanced physical properties.

Also known in the art are methods to produce planar forms in which a liquid crystal polymer film is laminated to a porous polymeric support membrane to form a composite sheet, and the composite sheet then stretched in one or more directions to multiaxially orient the liquid crystal polymer. Such methods are disclosed in European Patent Application No. EP 0 612 610 and U.S. Pat. No. 5,534,209 (to Moriya).

Unlike most other thermoplastic polymer resins, thermotropic liquid crystal polymers form high-viscosity melts having thixotropic characteristics. The melt viscosity of such materials, and the orientation of the liquid crystal polymer domains, are substantially altered in response to shear forces applied to the melted material. As noted above, these attributes can be very useful and are taken advantage of in the manufacture of articles having anisotropic properties and, to a large degree, can be controlled in the manufacture of articles having planar forms such as sheet, film, or other flat-shaped objects in which more balanced properties may be desired. However, due to these attributes, it is extremely difficult to form hollow or other complex-shaped articles of liquid crystal polymers using molding techniques commonly used with many other thermoplastic polymer resins, especially techniques such as blow-molding or vacuum-forming, in which a gas pressure differential across a polymer preform is used to force the preform against the molding surfaces. Consequently, molded articles of liquid crystal polymers formed by such techniques have yet to be developed.

It is a purpose of this invention to provide complex-shaped articles comprising a liquid crystal polymer, and further to provide methods by which such articles can be made by gas-pressure-differential molding techniques.

SUMMARY OF THE INVENTION

The invention provides thin-walled articles having complex non-planar shapes, formed by a gas-pressure-molding method, made of a composite material comprising a liquid crystal polymer and porous polytetrafluoroethylene material. By thin-walled articles is meant articles in which the thickness of the composite material forming the article is much less than the dimensions or spaces defined by the article. For example, food or pharmaceutical containers, automotive gas tanks, bottles or other vessels, and the like.

Gas-pressure-molding (or gas-pressure-forming) is used herein to describe methods in which air or other gas is applied or removed to create positive pressure or negative pressure at one side of a molding preform or parison, and thereby is used to assist in shaping and forming an article. Gas-pressure-molding thus includes methods more conventionally known as vacuum-forming or vacuum-molding, plug-assist vacuum-forming, air-pressure-forming, blow-molding, etc., and combinations thereof. It is to be understood that in the course of gas-pressure-molding the gas pressure may be varied on one or both sides of the parison or preform, either simultaneously or sequentially.

The composite material forming the wall(s) or sides of the article has at least three distinct regions through its thickness; an outermost region of porous polytetrafluoroethylene material only, an inner region of liquid crystal polymer only, and an intermediate region between the other two regions which contains both liquid crystal polymer and polytetrafluoroethylene materials; the intermediate region being formed by impregnation of a portion of the liquid crystal polymer forming the inner region into at least a portion of the pores of the inward-facing surface of the porous polytetrafluoroethylene material. Another embodiment of the invention is a molded article in which the composite material forming the article has more than three disinct regions.

This embodiment consists of a region of liquid crystal polymer only sandwiched between two regions of porous polytetrafluoroethylene material only between which intermediate regions containing both liquid crystal polymer and polytetrafluoroethylene material have been formed as described above.

A further embodiment of the invention is a parison for blow-molding a complex-shaped article. The parison comprises a tube of liquid crystal polymer material having at least one layer of porous polytetrafluoroethylene material fixed to its outer surface. The parison can also have one or more layers of porous polytetrafluoroethylene material fixed to its inner surface.

Yet a further embodiment of the invention is a method for gas-pressure-molding a complex-shaped article. The method includes forming a composite preform sheet having at least five distinct regions through its thickness; two outermost regions (i), each outermost region formed of a porous polytetrafluoroethylene material only, an inner region (iii) of liquid crystal polymer only, and two intermediate regions (ii) containing both liquid crystal polymer and polytetrafluoroethylene, each of the intermediate regions (ii) located between an outermost region (i) and the inner region (iii). The composite preform thus formed is disposed over a mold, so as to form a closed cavity, and heated to a temperature greater than the melt temperature of the liquid crystal polymer. A gas pressure-differential from one side of the preform to the other is created so as to cause the preform to deform and conform to the molding surfaces of the mold, thereby forming a shaped article. The article is then cooled and removed from the mold.

Another embodiment of the invention is another method for gas-pressure-molding a complex shaped article. The method includes disposing a parison described hereinabove in a shaped mold for blow-molding. The interior of the parison is pressurized with a heated gas so as to heat the parison to a temperature greater than the melt temperature of the liquid crystal polymer thereby causing the parison to expand and conform to the molding surfaces of the mold. The shaped article thus formed is cooled and removed from the mold.

DETAILED DESCRIPTION OF THE INVENTION

As noted earlier, molding non-planar complex shapes of a thermotropic liquid crystal polymer by methods such as blow-molding or vacuum-forming is extremely difficult or impractical due to the melt properties of the liquid crystal polymer. In particular, due to the ease with which shear forces applied during molding alter the melt viscosity and orientation of the material, it is difficult to control the crystalline orientation and thickness of the liquid crystal polymer during the molding steps so that complex-shaped articles having acceptable dimensional and physical properties can be produced.

The inventor has discovered that, by combining the liquid crystal polymer with a porous material to make a composite material, acceptable articles can be prepared by such gas-pressure-molding methods. The porous material provides support to the liquid crystal polymer during processing steps in the preparation of molding preforms or parisons, and further during the gas-pressure-molding steps used to form the liquid crystal polymer article. The porous material, preferably a fluoropolymer, and more preferably polytetrafluoroethylene, is also useful in facilitating release of a molded article from molding surfaces. The porous material can be kept as part of the finished article, or removed, as desired.

Figure 1:
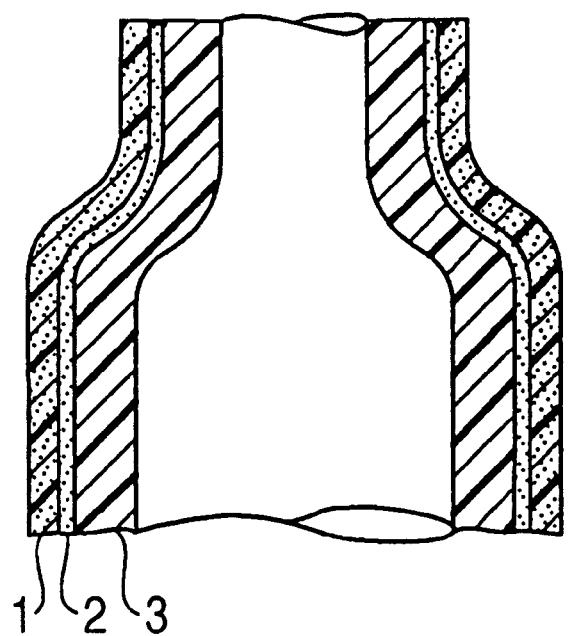
FIG. 1 is a cross-sectional view of a portion of a complex-shaped molded article of the invention having three distinct regions through the thickness of the composite material.

FIG. 1 is a cross-sectional view depicting a portion of a molded article of the invention in which the composite material forming the molded article has three distinct regions through its thickness; an outer region 1 of porous polytetrafluoroethylene material only, an inner region 3 of liquid crystal polymer only, and an intermediate region 2 containing both liquid crystal polymer and polytetrafluoroethylene material.

Figure 2:
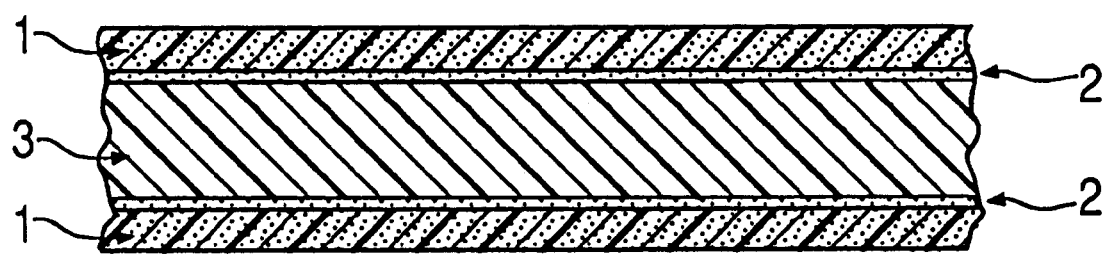
FIG. 2 is a cross-sectional view of a portion of a complex-shaped molded article of the invention, or a molding preform, having five distinct regions through the thickness of the composite material.
Figure 3A:
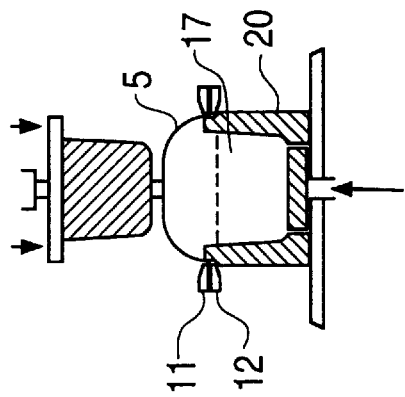
FIGS. 3, (a) through (f), are cross-sectional views of an apparatus representative of various steps in molding an article by a gas-pressure-molding method.
Figure 3F:
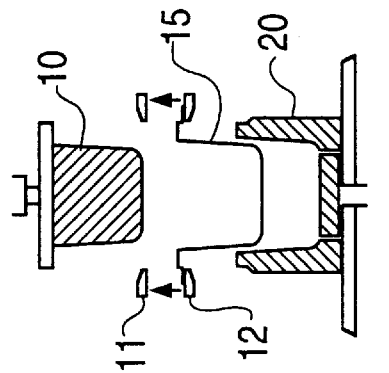
Figure 3B:
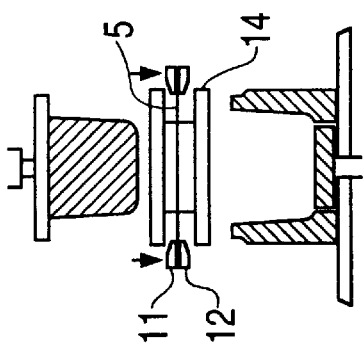
Figure 3E:
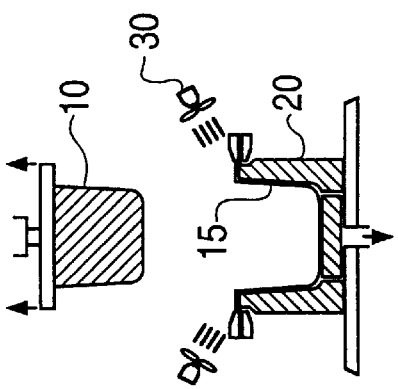
Figure 3C:
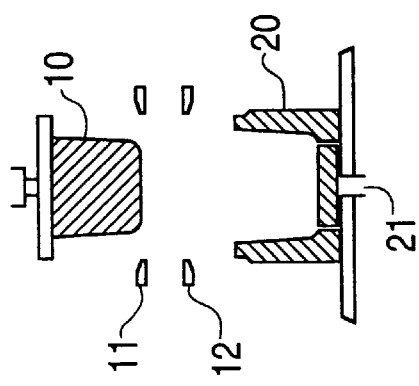
Figure 3D:
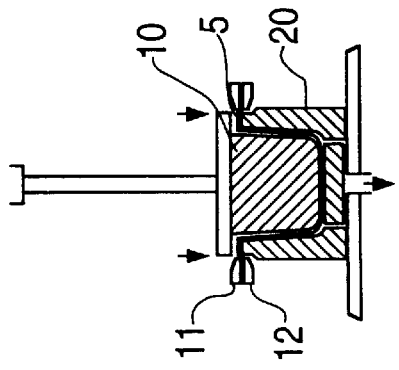

FIG. 2 is a cross-sectional view depicting a portion of a molded article of the invention in which the composite material forming the molded article has five distinct regions through its thickness; outer regions 1 of porous polytetrafluoroethylene material only, an inner region 3 of liquid crystal polymer only, and intermediate regions 2 containing both liquid crystal polymer and polytetrafluoroethylene material.

Many thermotropic liquid crystal polymers and liquid crystal polymer alloys are known in the art, are commercially available, and can be used in the composite material of the invention. Preferably, the liquid crystal polymer has a melt temperature of about 250° C. or higher, more preferably 280° C. or higher. Acceptable liquid crystal polymer melt temperatures are limited only by the properties of the polytetrafluoroethylene component, or other components, in the composite material and can be as high as 380° C. or more. Examples of suitable liquid crystal polymers are aromatic polyesters that exhibit liquid crystal properties when melted and that are synthesized from aromatic diols, aromatic carboxylic acids, hydroxycarboxylic acids, and the like. The following three types of polymers are typical examples: The first type (Formula 1 below) consisting of parahydroxybenzoic acid (PHB) and terephthalic acid; the second type (Formula 2 below) consisting of PHB and 2,6-hydroxynaphthoic acid; and the third type (Formula 3 below) consisting of PHB, terephthalic acid, and ethylene glycol.

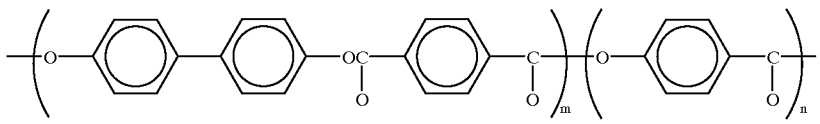

Formula 1

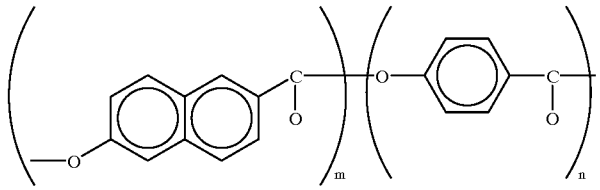

Formula 2

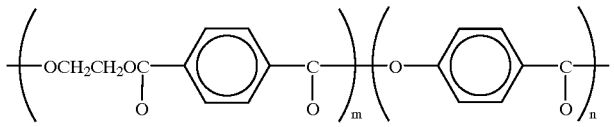

Formula 3

Also, in the present invention, a polymer alloy having a liquid crystal polymer component can be used. In such cases the polymer which is mixed with or chemically bonded to a liquid crystal polymer can be selected from the group consisting of, but not limited to, polyetheretherketone, polyphenylenesulfide, polyether sulfones, polyimides, polyetherimides, polyamides, polyamide-imides, polyesters, and polyarylates. The liquid crystal polymers and alloying polymers can be mixed in a weight ratio of 10:90 to 90:10, preferably in the range of 30:70 to 70:30. The alloying polymer should have a melt temperature of 200° C. or more, preferably 250° C. or more, and more preferably in the range 280 to 380° C.

The liquid crystal polymers and liquid crystal polymer alloys described hereinabove are meant for illustration and not for limitation of the invention. It is recognized by the inventor that many other liquid crystal polymers and liquid crystal polymer alloys suitable for use in the invention are known in the art. Likewise it is recognized that compatibilizers, plasticizers, flame retardant agents, and other additives; or particulate fillers such as fibers or powders of glass, alumina, silica, titania, zirconia, and the like, may be included with the liquid crystal polymers.

The material forming the porous outer region 1 should have high chemical resistance and high electrical insulating properties, and also, high heat resistance so as to be processible at the melt temperature of a liquid crystal polymer with which it is in contact. Fluoropolymers such as polytetrafluoroethylene, tetrafluoroethylene/hexafluoropropylene copolymer, tetrafluoroethylene/(perfluoroalkyl) vinyl ether copolymer, polyvinyl fluoride, polyvinylidene fluoride, ethylene/tetrafluoroethylene copolymer, polychlorotrifluoroethylene, and the like, have such characteristics and can be used. Polytetrafluoroethylene is the preferred fluoropolymer. In addition to its well known chemical inertness, excellent dielectric properties, and high termperature resistance, polytetrafluoroethylene has processing characteristics unique among fluoropolymers. Although considered a thermoplastic polymer, as are the other fluoropolymers listed above, polytetrafluoroethylene is not melt processible; does not form a liquid melt, as do the other fluoropolymers; remains solid when heated above its melt temperature and, furthermore, does not begin to thermally degrade until temperatures in excess of 400° C. are reached.

Porous polytetrafluoroethylene sheet or membrane suitable for use in the invention can be made by processes known in the art, for example, by stretching or drawing processes, by papermaking processes, by processes in which filler materials are incorporated with the PTFE resin and are subsequently removed to leave a porous structure, or by powder sintering processes. Preferably the porous polytetrafluoroethylene film is porous expanded polytetrafluoroethylene film having a structure of interconnected nodes and fibrils, as described in U.S. Pat. Nos. 3,953,566 and 4,187,390 which describe the preferred material and processes for making them. The porous polytetrafluoroethylene membrane should have a pore volume in the range 10 to 95 percent, preferably in the range 50 to 90 percent; and a nominal pore size in the range 0.05 to 5 micrometers, preferably in the range 0.2 to 1 micrometers.

To form a non-planar complex-shaped article by a gas-pressure-molding method such as vacuum-molding, the porous polytetrafluoroethylene material and liquid crystal polymer are first combined to form a composite sheet which serves as a preform for the molding step. Composite sheets useful as such preforms, and methods to make them, are disclosed in European Patent Application No. EP 0 612 610 and U.S. Pat. No. 5,534,209 (to Moriya), incorporated herein by reference.

In addition to depicting a molded article of the invention, FIG. 2 is also illustrative of a composite preform sheet in which the composite material of the preform has five distinct regions through its thickness; outer regions 1 of porous polytetrafluoroethylene material only, an inner region 3 of liquid crystal polymer only, and intermediate regions 2 containing both liquid crystal polymer and polytetrafluoroethylene material. The regions of the preform are maintained in the same relationship during the molding steps and the difference between the preform sheet and the molded article is in the non-planar complex shape of the gas-pressure-molded article.

The composite preform sheet can be made by conventional lamination methods. For example, a liquid crystal polymer film can be interposed between two porous polytetrafluoroethylene membranes and adhered together by application of heat and pressure by heated platens, or by passage through the nip of heated calender rolls. Typically, the temperature of the platens or rolls are in the range 10 to 50° C. higher than the melt point of the thermotropic liquid crystal polymer. In the lamination step an amount of liquid crystal polymer, sufficient to securely bond it to the support membrane, is forced into the pores of the surface region of the porous support membrane and mechanically interlocks with the pore structure of the porous support membrane. The bond strength between the liquid crystal polymer and porous polytetrafluoroethylene membrane increases with the amount of liquid crystal polymer penetrated into the porous membrane. Greater or lesser bond strength between the materials, above that needed for preform preparation or gas-pressure-molding, can be obtained by use of porous polytetrafluoroethylene membranes having different pore sizes and pore volumes and/or by varying lamination temperature and pressure. The liquid crystal polymer should penetrate the porous polytetrafluoroethylene membrane to a depth of at least 3 percent of the membrane thickness, preferably to a depth in the range 10 to 90 percent of the membrane thickness, and most preferably to a depth of 40 to 60 percent of the membrane thickness.

To prepare a preform sheet having porous polytetrafluoroethylene material on one side only, a sheet of nonporous release material can be substituted in place of one of the porous polytetrafluoroethylene membranes and lamination effected as described above, after which the release sheet can be separated from the composite sheet. A preform sheet having porous polytetrafluoroethylene material on one side only can also be prepared by superposing a liquid crystal polymer film on a porous polytetrafluoroethylene membrane, applying heat by platen or calender roll from the polytetrafluoroethylene side only, and superficially melting the liquid crystal polymer film to effect penetration of an amount of liquid crystal polymer into the porous polytetrafluoroethylene as described above. Alternatively, the liquid crystal polymer may be applied by direct extrusion of a film onto the surface of the porous polytetrafluoroethylene support membrane. It is also possible to prepare a composite preform sheet having porous polytetrafluoroethylene material on one side only by removing a porous polytetrafluoroethylene membrane from one side of a composite sheet having a porous polytetrafluoroethylene membrane on both sides. This is facilitated when the membranes are bonded to the liquid crystal polymer film with different bond strengths as described earlier.

The porous polytetrafluoroethylene membrane used in the composite preform sheet can be as much as 500 micrometers thick, but is preferably in the range 1 to 300 micrometers thick, and more preferably in the range 10 to 100 micrometers thick. The thickness of the liquid crystal polymer film used in the composite preform sheet should be 5 micrometers or greater, preferably in the range 0.005 to 3 mm, and is determined according to the product to be made from the preform. The thickness of the porous polytetrafluoroethylene membrane should be in the range 5 to 80 percent, preferably in the range 10 to 50 percent, of the thickness of the liquid crystal polymer film.

It is preferable that the composite preform sheet be stretched in one or more directions in order to multiaxially orient the liquid crystal polymer and obtain a composite preform sheet which has relatively balanced physical properties, at least in the machine-direction and transverse-direction; or to preferentially orient the liquid crystal polymer in certain directions to compensate for orientation forces which may be imparted to the composite preform sheet in a subsequent molding step. Suitable stretching methods are disclosed in European Patent Application No. EP 0 612 610 and U.S. Pat. No. 5,534,209 (to Moriya), included herein by reference.

Longitudinal direction, x-direction, and machine direction (MD) as used herein indicate the direction of manufacture of a film or sheet; transverse direction (TD) and y- or z-direction indicate directions normal to the direction of manufacture.

In the stretching step the composite preform sheet is heated to a temperature at or above the melt point of the liquid crystal polymer and, preferably stretched in at least two directions. Stretching in at least two directions may be done simultaneously or sequentially, and may be done in one or more steps. The amount of stretch, relative to original planar x-y directions, is ordinarily in the range 1 to 10:1 in the machine (x) direction, preferably in the range 1 to 5:1; and in the transverse (y) direction in the range 1 to 20:1, preferably in the range 3 to 15:1.

Stretching may be done using conventional equipment or apparatus known in the art. For example, multiaxial simultaneous stretching can be done using a radial stretching pantograph; and biaxial stretching in the planar x-y directions can be done, simultaneously or sequentially, using an x-y direction stretching pantograph. Also, equipment providing sequential uniaxial stretching can be used, for example, a machine having a section containing differential speed rolls for stretching in the machine direction (MD), and a tenter frame machine for stretching in the transverse direction (TD).

The composite preform sheet thus produced is useful as a preform for producing complex-shaped articles by gas-pressure-molding such as vacuum-forming, plug-assisted vacuum-forming, and the like. In such methods the composite sheet preform is first positioned over a mold to form a cavity, and then sealed around the mold so that the cavity can be uniformly pressurized or evacuated. The preform is then heated to a temperature greater than the melt point of the liquid crystal polymer and a gas pressure differential created between one side of the preform and the other side. The gas pressure differential causes the preform to deform and conform to the surfaces of the mold. It is believed that the presence of the porous polytetrafluoroethylene membrane in the composite preform sheet aids in uniformly distributing the deformation forces and inhibits or prevents localized or nonuniform shear forces from being applied to the liquid crystal polymer component; and thereby prevents blowouts or localized thinning of the liquid crystal polymer component.

With reference to FIG. 3 a method for gas-pressure-molding is described hereinbelow. FIG. 3(a) depicts a plug-assist vacuum-molding apparatus consisting of a male plug 10, preform clamps 11, 12, and female mold 20, in axial alignment. The female mold 20 has a port 21 for introduction or removal of a gas. In FIG. 3(b) a preform 5 has been inserted in the clamps and the clamps closed. Heater assembly 14 has been positioned to heat the preform to the molding temperature. Referring to FIG. 3(c), when the molding temperature has been reached, the heater is removed and the clamped preform 5 (represented by the dotted line) lowered across the opening of the female mold 20 and sealed around the opening to prevent gas leakage. Heated gas is introduced into the female mold 20 through the port 21 and the cavity 17 formed by the preform and female mold is pressurized. The preform 5 (now represented by the solid line) is forced by the heated gas to uniformly expand outward from the mold, much as a balloon inflates, a predetermined amount. The heated gas is then released back through the port and, as the gas pressure drops, the male plug 10 is lowered against the expanded preform 5 and proceeds to form it and push it into the female mold as the gas pressure in the space between the preform and the female mold drops. The gas pressure in the cavity is further reduced by evacuation of residual gases outward through the port to draw the preform 5 against the wall of the female mold. The male plug 10 ends its travel in the female mold 20, as shown in FIG. 3(d), to complete the shaping of the article. In FIG. 3(e) the male plug 10 has been removed, the molded article 15 and female mold 20 cooled by any acceptable means, for example, by fans 30 blowing air on them. In FIG. 3(f), the molded article 15 has been removed from the female mold 20 and clamps 11, 12, holding the molded article opened.

The method described above is useful in illustrating the different ways in which a differential gas pressure can be applied to either or both sides of a preform to obtain a complex-shaped article by gas-pressure-molding. In this case a positive gas pressure and, sequentially, a negative gas pressure (vacuum) are applied to the same side of a composite preform sheet thereby creating a first gas pressure differential across the preform by which the preform is deformed in one direction and, sequentially, creating a second pressure differential across the preform by which the preform is forced in the opposite direction. It is readily apparent that a differential gas pressure for exerting molding and shaping forces on a preform can be used singly, or in sequential or simultaneous combination. For example, a positive pressure can be applied to one side of a preform simultaneous with application of a negative pressure (vacuum) to the other side.

To form a non-planar complex-shaped article by a gas-pressure-molding such as blow-molding, the porous polytetrafluoroethylene material and liquid crystal polymer are first combined to form a parison, i.e., a hollow tubular preform to be formed into a hollow object by blow-molding. The parison comprises a tube of liquid crystal polymer material having at least one layer of porous polytetrafluoroethylene material fixed to its outer surface. The parison can also have one or more layers of porous polytetrafluoroethylene material fixed to its inner surface.

To make the parison a tube or hollow cylindrical shape of liquid crystal polymer is first provided. The tube of liquid crystal polymer can be made by extrusion, injection molding, extrusion blow-molding, injection blow-molding, or by other methods known in the art. Tubes of liquid crystal polymer made by these or other methods will generally be oriented in the longitudinal direction. In this instance, however, this is not a problem as, in the blow-molding step, the tube is stretched or expanded radially, in a direction generally perpendicular to the direction of orientation making it possible to obtain a blow-molded article with well balanced properties.

A porous polytetrafluoroethylene layer is fixed to at least the outer surface of the liquid crystal polymer tube. By "fixed" is meant only that the layer of porous polytetrafluoroethylene material be attached to the tube sufficiently strongly to withstand further processing. As no subsequent stretching step is needed, as in the case of the composite preform described above, the porous polytetrafluoroethylene material can be attached to the liquid crystal polymer tube by wrapping porous a polytetrafluoroethylene membrane or tape, having the pore size and pore volume characteristics specified earlier, on the tube sufficiently tightly to permit handling and insertion onto a blow-molding fixture. The porous polytetrafluoroethylene material can be helically or longitudinally wrapped around the liquid crystal polymer tube, in single or multiple layers. The porous polytetrafluoroethylene layer can also be formed on the inner or outer surfaces of the liquid crystal polymer tube using porous polytetrafluoroethylene tubing. In this case, it is customary to use porous polytetrafluoroethylene tubing having inside and outside diameters such that a friction fit between the liquid crystal polymer and porous polytetrafluoroethylene surfaces can be obtained. An adhesive can also be used to attach the porous polytetrafluoroethylene to the liquid crystal polymer tube, but is generally not needed. The porous polytetrafluoroethylene tubing should also have the pore size and pore volume characteristics specified earlier.

The wall of the liquid crystal polymer tube comprised in the parison should be in the range 0.2 to 5 mm thick, preferably in the range 1 to 3 mm thick. The porous polytetrafluoroethylene layer should be in the range 25 to 500 micrometers thick, preferably in the range 10 to 300 micrometers thick. The porous polytetrafluoroethylene layer should be thinner than the liquid crystal polymer layer, preferably being 1/50 to 1/3 as thick, more preferably 1/10 to 1/5 as thick as the liquid crystal polymer layer.

Blow-molding a complex-shaped article using the parison described above is done using equipment and methods known in the art. The parison is mounted in a conventional blow-molding apparatus, heated and pressurized internally by heated gas to a temperature greater than the melt temperature of the liquid crystal polymer, and expanded to conform to the shaping surfaces of the blow-molding mold. In the blow-molding step the liquid crystal polymer is melted and an amount of liquid crystal polymer is forced into the pores of the surface region of the porous support membrane and mechanically interlocks with the pore structure of the porous polytetrafluoroethylene layer. The bond strength between the liquid crystal polymer and porous polytetrafluoroethylene layer increases with the amount of liquid crystal polymer penetrated into the porous layer. Greater or lesser bond strength between the materials can be obtained by use of porous polytetrafluoroethylene material having different pore sizes and pore volumes and/or by varying blow-molding temperature and pressure.

The porous polytetrafluoroethylene material comprised in the composite preform sheet or blow-molding parison, in addition to providing needed support during the gas-pressure-molding steps, also serves as an excellent mold-release material, greatly facilitates removal of the molded article from the mold and prevents contamination of the mold surfaces by melted liquid crystal polymer. However, depending on the end use of the article, it may be desirable to remove the porous polytetrafluoroethylene material from one or both surfaces of the molded article. Removal of the porous material from the surface of a molded article can be facilitated by minimizing the bond strength between the porous polytetrafluoroethylene to be removed and the liquid crystal polymer by the methods described above.

EXAMPLE 1

Composite Preform Sheet

A thermotropic liquid crystal polymer (tradename Sumika Super E7000, made by Sumitomo Chemical Co.) was melted in a uniaxial extruder (screw diameter: 50 mm) and extruded through a T-die (lip length: 500 mm; lip clearance: 1 mm; die temperature 320° C.), and cooled to produce a film 250 micrometers thick.

The liquid crystal polymer film was interposed between two expanded polytetrafluoroethylene membranes (nominal pore size: 0.2 µm; pore volume: 80%; thickness: 40 µm) and laminated together by application of heat and pressure in passage between calender rolls heated to 330° C. at a rate of 2 m/min to form a composite sheet. The composite sheet was cooled by passage between two cooling rolls (roll temperature: 150° C.; roll diameter: 50 mm).

The composite sheet was subsequently sequentially stretched biaxially an amount of 3:1; an amount 1.2:1 in the machine direction, and an amount 2.5:1 in the transverse direction. Stretching temperature was 315° C. and the stretch rate was 10% per second. After stretching the composite sheet was heat treated for 10 minutes at 260° C.

The composite preform sheet thus formed was about 70 micrometers thick. Liquid crystal polymer had penetrated into each of the porous polytetrafluoroethylene membranes to form a region about 10 micrometers thick containing both liquid crystal polymer and polytetrafluoroethylene.

EXAMPLE 2
Composite Preform Sheet

A thermotropic liquid crystal polymer (tradename Sumika Super E7000, made by Sumitomo Chemical Co.) was extruded through a T-die at a temperature of 350° C., and cooled to produce a film 1 mm thick.

The liquid crystal polymer film was interposed between two expanded polytetrafluoroethylene membranes (nominal pore size: 0.2 $\mu$m; pore volume: 80%; thickness: 100 $\mu$m) and laminated together by application of heat and pressure between platens heated to 350° C. at a pressure of 20 kg/cm$^2$ to form a composite sheet.

EXAMPLE 3
Plug-Assist Vacuum-Molded Article

The composite preform sheet of Example 2 was molded in the apparatus depicted in FIG. 3. The female mold diameter was about 100 mm and the mold height was about 33 mm. The walls of the male plug and female mold were tapered about 3° and the corners of the male plug and female mold had a radius of 2 mm.

The mold temperature was 330° C. and the composite preform sheet was heated to 350° C. before the heaters were removed, and the molding steps completed as described hereinabove with reference to FIG. 3. The fininshed molded article was a cylindrical container having a wall thickness of 0.4 to 0.7 mm.

EXAMPLE 4
Blow-Molded Article

A thermotropic liquid crystal polymer (tradename Sumika Super E7000, made by Sumitomo Chemical Co.) was extrusion-blow-molded to form a tube 20 cm long, 20 mm inside diameter, and having a wall 1 mm thick.

The liquid crystal polymer tube was spirally-wrapped with two layers of expanded polytetrafluoroethylene membrane (nominal pore size: 0.2 $\mu$m; pore volume: 80%; thickness: 50 $\mu$m) to form a composite blow-molding parison. The membrane was wrapped sufficiently tightly to hold itself in place and no adhesive was needed to attach it to the liquid crystal polymer tube.

The parison was mounted in a conventional bottle-forming mold. The mold was heated to 320° C. and air heated to 380° C. was forced into the parison for blow-molding, after which the mold was opened and the formed article cooled. The article formed was a bottle 22 cm long, 24 mm inside diameter, and having a wall 0.7 to 0.8 mm thick.

EXAMPLE 5
Blow-Molded Article

A thermotropic liquid crystal polymer (tradename Sumika Super E7000, made by Sumitomo Chemical Co.) was extrusion-blow-molded to form a tube 10 cm long, 10 mm inside diameter, and having a wall 2 mm thick.

The liquid crystal polymer tube was spirally-wrapped with four layers of expanded polytetrafluoroethylene membrane (nominal pore size: 0.2 $\mu$m; pore volume: 80%; thickness: 50 $\mu$m) to form a composite blow-molding parison. The membrane was wrapped sufficiently tightly to hold itself in place and no adhesive was needed to attach it to the liquid crystal polymer tube.

The parison was mounted in a conventional bottle-forming mold. The mold was heated to 320° C. and air heated to 380° C. forced into the parison for blow-molding, after which the mold was opened and the formed article cooled. The article formed was a bottle 22 cm long, 24 mm inside diameter, and having a wall 0.7 to 0.8 mm thick.

Comparative Example 1

A thermotropic liquid crystal polymer (tradename Sumika Super E7000, made by Sumitomo Chemical Co.) was melted in a uniaxial extruder (screw diameter: 50 mm) and extruded through a T-die (lip length: 500 mm; lip clearance: 1 mm; die temperature 320° C.), and cooled to produce a film 250 micrometers thick, as described in Example 1. The liquid crystal polymer film was not combined with porous polytetrafluoroethylene material.

The liquid crystal polymer film was mounted in the plug-assist vacuum-molding apparatus and molded as described in Example 3.

The molten liquid crystal polymer sheet flowed uncontrollably and adhered to the mold.

Comparative Example 2

A thermotropic liquid crystal polymer (tradename Sumika Super E7000, made by Sumitomo Chemical Co.) was extrusion-blow-molded to form a tube 20 cm long, 20 mm inside diameter, and having a wall 1 mm thick, as described in Example 4. The liquid crystal polymer tube was not wrapped with porous polytetrafluoroethylene material.

The liquid crystal polymer tube was mounted and blow-molded as described in Example 4. One section of the liquid crystal polymer tube became very thin and a hole formed in it.

Comparative Example 3

A thermotropic liquid crystal polymer (tradename Sumika Super E7000, made by Sumitomo Chemical Co.) was extrusion-blow-molded to form a tube 10 cm long, 10 mm inside diameter, and having a wall 2 mm thick, as described in Example 5. The liquid crystal polymer tube was not wrapped with porous polytetrafluoroethylene material.

The liquid crystal polymer tube was mounted and blow-molded as described in Example 5. One section of the liquid crystal polymer tube became very thin and a hole formed in it.

I claim:

1. A method for blow-molding a shaped article including thermotropic liquid crystal polymer material comprising the steps of:

(a) providing a parison, said parison comprising a tube of thermotropic liquid crystal polymer material having an inward-facing surface and an outward-facing surface, and at least one layer of porous polytetrafluoroethylene material fixed to said outward-facing surface;

(b) disposing said parison in a shaped mold for blow-molding;

(c) pressurizing the interior of said parison with a heated gas and heating said parison to a temperature greater than the melt point of said liquid crystal polymer;

(d) creating a differential gas pressure from inside said parison to outside said parison so as to cause said parison to expand and conform to the molding surfaces of said mold, and thereby forming a molded article having a nonplanar shape;

(e) cooling and removing said article from the mold.

2. The method for blow-molding a shaped article as recited in claim 1 wherein the porous polytetrafluoroethylene material is selected from the group consisting of porous expanded polytetrafluoroethylene film and porous expanded polytetrafluoroethylene tubing.

3. The method for blow-molding a shaped article as recited in claim 1 further comprising the step of removing the porous polytetrafluoroethylene material from said molded article.

4. The method for blow-molding a shaped article as recited in claim 2 further comprising the step of removing the porous polytetrafluoroethylene material from said molded article.

5. A method for blow-molding a shaped article including thermotropic liquid crystal polymer material comprising the steps of:

(a) providing a parison, said parison comprising a tube of thermotropic liquid crystal polymer material having an inward-facing surface and an outward-facing surface, and at least one layer of porous polytetrafluoroethylene material fixed to each of said surfaces;

(b) disposing said parison in a shaped mold for blow-molding;

(c) pressurizing the interior of said parison with a heated gas and heating said parison to a temperature greater than the melt point of said liquid crystal polymer;

(d) creating a differential gas pressure from inside said parison to outside said parison so as to cause said parison to expand and conform to the molding surfaces of said mold, and thereby forming a molded article having a nonplanar shape;

(e) cooling and removing said article from the mold.

6. The method for blow-molding a shaped article as recited in claim 5 wherein the porous polytetrafluoroethylene material is selected from the group consisting of porous expanded polytetrafluoroethylene film and porous expanded polytetrafluoroethylene tubing.

7. The method for blow-molding a shaped article as recited in claim 5 further comprising the step of removing the porous polytetrafluoroethylene material from at least one side of said molded article.

8. The method for blow-molding a shaped article as recited in claim 6 further comprising the step of removing the porous polytetrafluoroethylene material from at least one side of said molded article.

* * * * *